United States Patent
Mahamuni et al.

(10) Patent No.: US 9,081,567 B1
(45) Date of Patent: Jul. 14, 2015

(54) METHOD AND APPARATUS TO CONTROL ROUTING CONVERGENCE DURING NODE REBOOT BY ENTERING A FREEZE STATE THAT INHIBITS ROUTING CONVERGENCE DURING THE REBOOT PROCESS

(75) Inventors: Atul B. Mahamuni, Fremont, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 173 days.

(21) Appl. No.: 13/188,356

(22) Filed: Jul. 21, 2011

(51) Int. Cl.
| G06F 9/00 | (2006.01) |
| G06F 15/177 | (2006.01) |
| H04L 12/28 | (2006.01) |
| G06F 1/32 | (2006.01) |

(52) U.S. Cl.
CPC .................................. G06F 1/3203 (2013.01)

(58) Field of Classification Search
CPC .................................................... G06F 1/3203
USPC ............................................................ 713/2
See application file for complete search history.

(56) References Cited

U.S. PATENT DOCUMENTS

| 6,704,795 | B1 | 3/2004 | Fernando et al. |
| 6,785,843 | B1 | 8/2004 | McRae et al. |
| 6,950,427 | B1 | 9/2005 | Zinin |
| 7,065,059 | B1 | 6/2006 | Zinin |
| 7,355,983 | B2 | 4/2008 | Scudder et al. |
| 7,359,377 | B1 * | 4/2008 | Kompella et al. ............. 370/389 |
| 7,457,248 | B1 | 11/2008 | Ali et al. |
| 7,656,857 | B2 | 2/2010 | Thubert et al. |
| 7,710,899 | B1 | 5/2010 | Ward et al. |
| 2005/0177634 | A1 * | 8/2005 | Scudder et al. ............... 709/225 |
| 2007/0091811 | A1 * | 4/2007 | Thubert et al. ................ 370/238 |
| 2008/0089231 | A1 * | 4/2008 | Appanna et al. .............. 370/235 |
| 2009/0262642 | A1 * | 10/2009 | van Greunen et al. ........ 370/216 |
| 2010/0042820 | A1 * | 2/2010 | Clemm et al. .................... 713/2 |
| 2012/0155329 | A1 * | 6/2012 | Shaffer et al. ................. 370/255 |

(Continued)

OTHER PUBLICATIONS

Winter, et al., "RPL: IPv6 Routing Protocol for Low Power and Lossy Networks," Internet Engineering Task Force (IETF) Internet Draft, Mar. 13, 2011 version, <draft-ietf-roll-rpl-19>, 164 pages.

(Continued)

*Primary Examiner* — Thomas Lee
*Assistant Examiner* — Robert Cassity
(74) *Attorney, Agent, or Firm* — Novak Druce Connolly Bove + Quigg LLP (57) ABSTRACT

In one embodiment, a technique may enable control of routing convergence in a computer network during reboot of a node of a routing topology represented by a directed acyclic graph (DAG). The rebooting node, e.g., a DAG root node, may transmit a reboot notification message to nodes of the routing topology indicating that the rebooting node is unavailable during a subsequent reboot process. In response to receiving and processing the reboot notification message, the nodes of the routing topology may enter a DAG freeze state that inhibits (prevents) routing convergence in the routing topology during the reboot process so as prevent adverse consequences on network stability, such as collapse of the DAG. Thereafter upon completion of the reboot process, the rebooting node may transmit a clear message to the nodes of the routing topology that instructs the nodes to exit the DAG freeze state.

20 Claims, 7 Drawing Sheets

(56) References Cited

U.S. PATENT DOCUMENTS

2012/0155475 A1* 6/2012 Vasseur et al. ............... 370/400
2012/0269198 A1* 10/2012 Patel et al. ................... 370/400

OTHER PUBLICATIONS

Vasseur, et al., "Routing Metrics used for Path Calculation in Low Power and Lossy Networks," Internet Engineering Task Force (IETF) Internet Draft, Mar. 1, 2011 version, <draft-ietf-roll-routing-metrics-19>, 30 pages.

Thubert, "RPL Objective Function 0," Internet Engineering Task Force (IETF) Internet Draft, Jul. 8, 2011 version, <draft-ietf-roll-of0-15>, 8 pages.

U.S. Appl. No. 13/117,276 entitled Distributed Control Technique for RPL Topology, filed May 27, 2011 by Navneet Agarwal, 33 pages.

U.S. Appl. No. 12/951,198 entitled Method and Apparatus to Reduce Cumulative Effect of Dynamic Metric Advertisement in Smart Grid/Sensor Networks, filed Nov. 22, 2010 by Jean-Philippe Vasseur, 30 pages.

* cited by examiner

METHOD AND APPARATUS TO CONTROL ROUTING CONVERGENCE DURING NODE REBOOT BY ENTERING A FREEZE STATE THAT INHIBITS ROUTING CONVERGENCE DURING THE REBOOT PROCESS

TECHNICAL FIELD

The present disclosure relates generally to computer networks, and, more particularly, to management and control of convergence in routing topologies represented by directed acyclic graphs (DAG), e.g., for Low power and Lossy Networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or low processing capability of nodes. One example routing solution to LLN challenges is a protocol called Routing Protocol for LLNs or "RPL," which is a distance vector routing protocol. One or more instances of the RPL protocol can be used to build a routing topology that is deployed over the LLN using a set of metrics and constraints. Each RPL routing topology built by an RPL instance may be represented by a Directed Acyclic Graph (DAG) that is rooted by a root node. Other nodes of the LLN may participate in the routing topology by discovering and attaching to the DAG based on configuration and policies.

The root node of the DAG is a central authority that manages and controls several critical routing parameters used by the nodes participating in the RPL topology. Furthermore because of the DAG structure, a substantial amount of traffic in the routing topology tends to be concentrated around the DAG root node. A software upgrade or change in operational mode of the DAG root node may result in a failure (i.e., unavailability) and subsequent reboot (via a reboot process) of the root node. In response to detecting that the DAG root node is unavailable, the other nodes may attempt (re-) convergence in the routing topology by, e.g., attaching to another root node, thereby possibly leading to collapse of the DAG. Consequently, a reboot of the DAG root node may have adverse consequences on network stability.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a technique may enable control of routing convergence in a computer network during reboot of a node of a routing topology represented by a directed acyclic graph (DAG). The rebooting node, e.g., a DAG root node, may transmit a reboot notification message to nodes of the routing topology indicating that the rebooting node is unavailable during a subsequent reboot process. In response to receiving and processing the reboot notification message, the nodes of the routing topology may enter a DAG freeze state that inhibits (prevents) routing convergence in the routing topology during the reboot process so as prevent adverse consequences on network stability, such as collapse of the DAG. Thereafter upon completion of the reboot process, the rebooting node may transmit a clear message to the nodes of the routing topology that instructs the nodes to exit the DAG freeze state.

Description

A computer network is a geographically distributed collection of nodes interconnected by communication links and segments for transporting data between end nodes, such as personal computers and workstations, or other devices, such as sensors. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2 and others. In addition, a Mobile Ad-Hoc Network (MANET) is a type of wireless ad-hoc network that is generally considered a self-configuring network of mobile routes (and associated hosts) connected by wireless links, the union of which forms an arbitrary topology.

Smart object networks, such as sensor networks in particular, are a specific type of network consisting of spatially distributed autonomous devices such as sensors that cooperatively monitor physical or environmental conditions at different locations such as, e.g., temperature, pressure, vibration, sound, radiation, motion and/or pollutants. Other types of smart objects include actuators, e.g., objects responsible for turning on/off an engine or performing other actions. Sensor networks are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

Sensor networks generally do not have a predefined routing topology imposed by, for example, point-to-point wires, so links and sensors are typically discovered, selected and configured sparingly. In certain configurations, the sensors in a sensor network transmit their data to one or more centralized or distributed database management nodes that obtain the data for use with one or more associated applications. Alternatively (or in addition), certain sensor networks provide for mechanisms by which an interested subscriber (e.g., "sink") may specifically request data from nodes in the network. In a "push mode," the sensors transmit their data to the sensor sink/subscriber without prompting, e.g., at a regular interval/frequency or in response to external triggers. Conversely, in a "pull mode," the sensor sink may specifically request that the sensors (e.g., specific sensors or all sensors) transmit their current data (or take a measurement and transmit that result) to the sensor sink. (Those skilled in the art will appreciate the benefits and shortcomings of each mode, and both apply to the technique described herein.)

Figure 1:
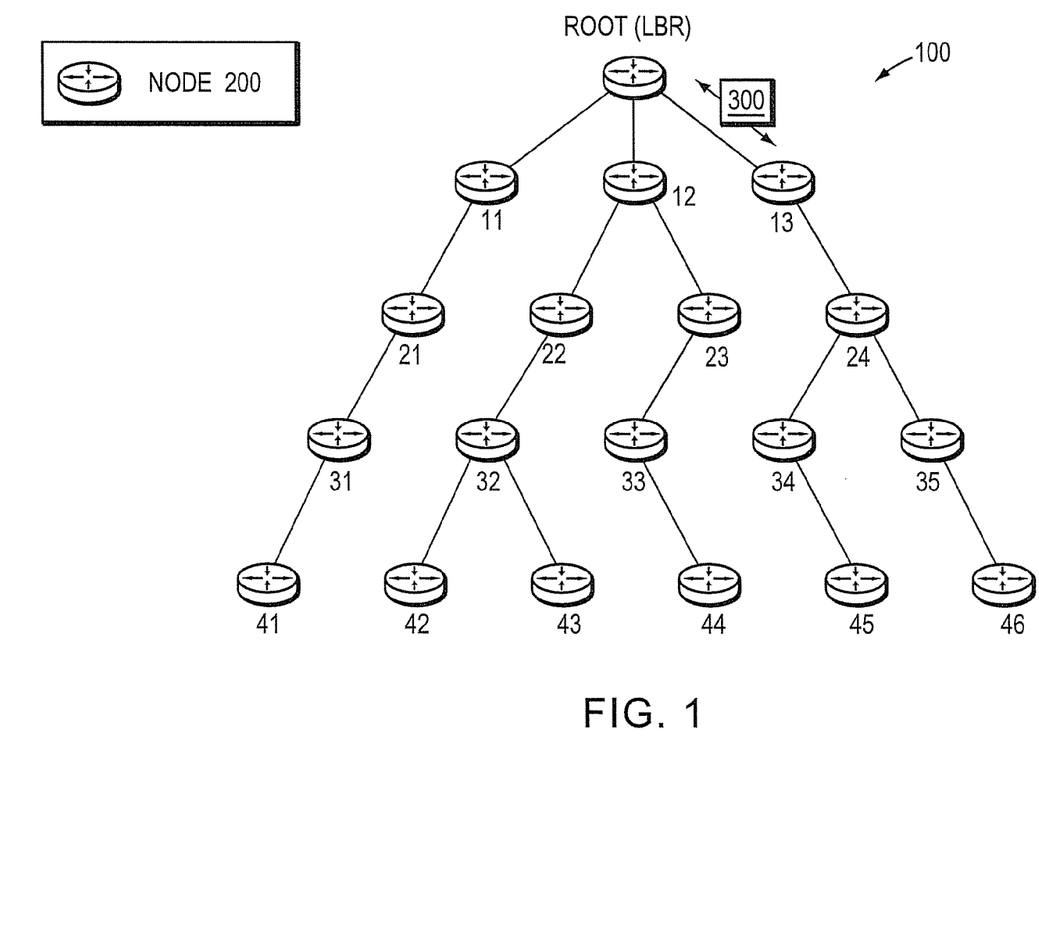
FIG. 1 illustrates an example routing topology deployed over a computer network and represented by a directed acyclic graph (DAG)

FIG. 1 illustrates an example routing topology deployed over a computer network 100 comprising nodes/devices 200, such as, e.g., routers, sensors and/or computers, interconnected by various methods of communication, such as links, and labeled as shown (e.g., "LBR," "11," "12," . . . "46"). The links of the computer network may be wired links or may comprise a wireless communication medium, where certain nodes 200 of the network may be in communication with other nodes 200, e.g., based on distance, signal strength, current operational status and/or location. Those skilled in the art will understand that any number of nodes, devices, and/or links may be used in the computer network, and that the view shown herein is for simplicity. Illustratively, certain nodes in the network may be more capable than others, such as those nodes having, e.g., larger memories and/or sustainable non-battery power supplies, versus those nodes having minimal memory and/or battery power. For instance certain nodes 200 may have no or limited memory capability. Also, one or more of the nodes 200 may be considered root nodes/devices while one or more of the nodes may also be considered destination nodes/devices.

Data packets or messages 300 (e.g., traffic sent between the devices/nodes) may be exchanged among the nodes/devices of the computer network 100 using predefined network communication protocols such as, among others, the Transmission Control Protocol/Internet Protocol (TCP/IP), User Datagram Protocol (UDP), Multi-Protocol Label Switching (MPLS) and/or various proprietary protocols. In this context, a protocol consists of a set of rules defining how the nodes interact with each other. In addition, messages within the network 100 may be transmitted in a different manner depending upon node capabilities, such as source routed messages.

Figure 2:
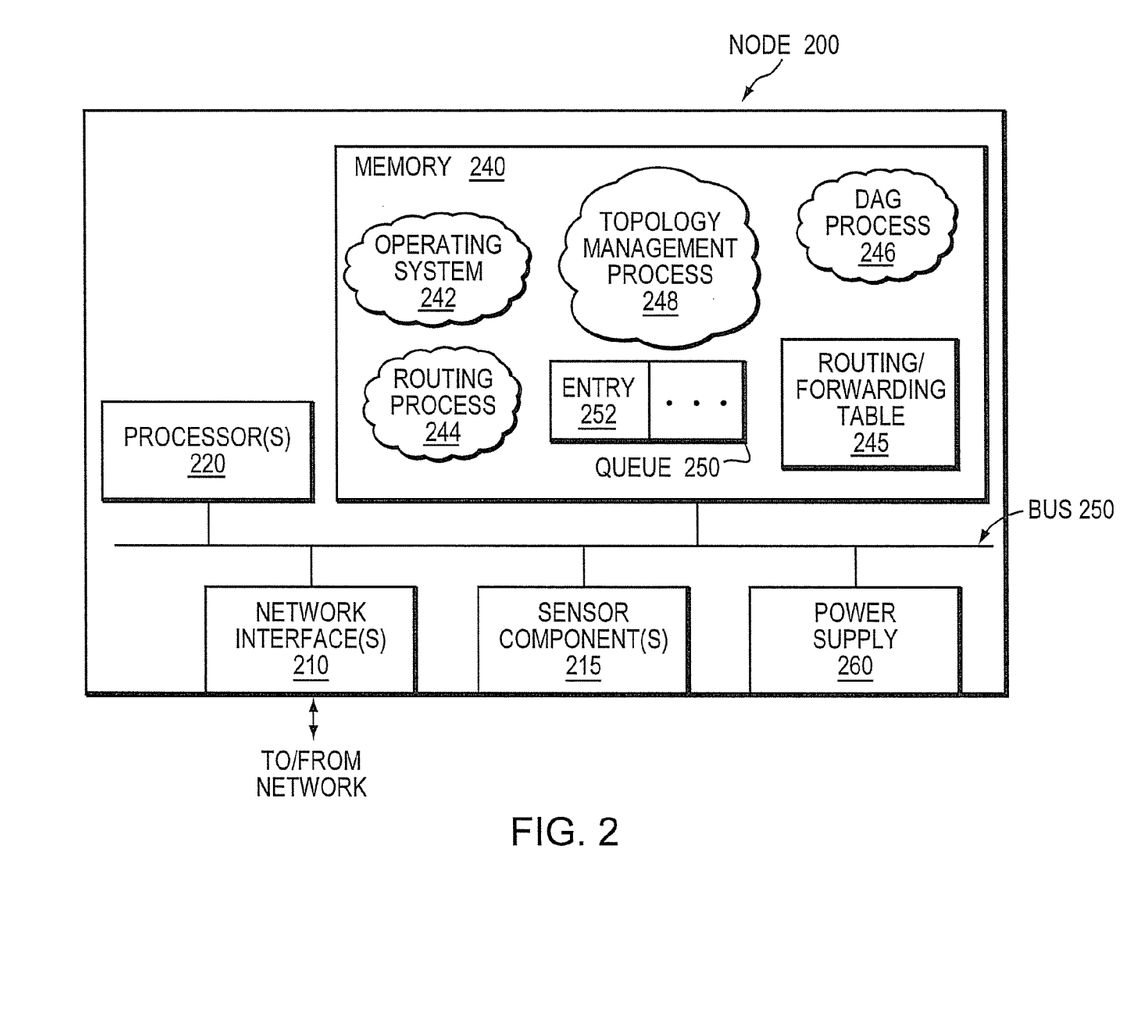
FIG. 2 illustrates an example network node/device.

FIG. 2 illustrates an example node/device 200 that may be used with one or more embodiments described herein, e.g., as a root node, intermediate node or sensor. The node may comprise one or more network interfaces 210, one or more sensor components 215 (e.g., sensors, actuators), a power supply 260 (e.g., battery, plug-in), one or more processors 220 (e.g., 8-64 bit microcontrollers), and a memory 240 interconnected by a system bus 250. The network interface(s) 210 contain the mechanical, electrical, and signaling circuitry for communicating data over physical and/or wireless links coupled to the network 100. The network interface(s) may be configured to transmit and/or receive data using a variety of different communication protocols, including, inter alia, TCP/IP, UDP, wireless protocols (e.g., IEEE Std. 802.15.4, WiFi, Bluetooth®,), Ethernet and/or PLC protocols.

The memory 240 comprises a plurality of storage locations that are addressable by the processor(s) 220 and the network interface(s) 210 for storing software programs and data structures associated with the embodiments described herein. As noted above, certain nodes may have limited memory or no memory (e.g., no memory for storage other than for programs/processes operating on the node). The processor(s) 220 may comprise necessary elements or logic adapted to execute the software programs and manipulate the data structures, such as entries 252 of queues 250 and routes or prefixes of a routing/forwarding table 245 (notably on capable nodes). An operating system 242, portions of which are typically resident in memory 240 and executed by the processor(s), functionally organizes the node by, inter alia, invoking operations in support of software processes and/or services executing on the node. These software processes and/or services may comprise routing process (services) 244, which may include an illustrative directed acyclic graph (DAG) process 246. Also, for root nodes (or other management nodes), a topology management process 248 may be used. It will be apparent to those skilled in the art that other processor and memory types, including various computer-readable media, may be used to store and execute program instructions pertaining to the technique described herein. Also, while the description illustrates various processes, it is expressly contemplated that the various processes may be embodied as modules configured to operate in accordance with the technique herein (e.g., according to the functionality of a similar process).

Routing process/services 244 contains computer executable instructions executed by the processor(s) 220 to perform functions provided by one or more routing protocols, such as proactive or reactive routing protocols as will be understood by those skilled in the art. These functions may, on capable nodes, be configured to manage routing/forwarding table 245 containing, e.g., information used to make routing/forwarding decisions. In particular, in proactive routing, connectivity is discovered and known prior to computing routes to any destination in the network, e.g., link state routing such as Open Shortest Path First (OSPF), Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR) and DYnamic MANET On-demand Routing (DYMO). Notably, on nodes not capable or configured to store routing entries, routing process 244 may consist solely of providing mechanisms necessary for source routing techniques. That is, for source routing, other nodes in the network can direct the less capable nodes exactly where to send the messages, and the less capable nodes simply forward the messages as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to low rate data traffic;

3) A number of use cases require specifying a set of link and node metrics, some being dynamic, thus requiring specific smoothing functions to avoid routing instability, considerably draining bandwidth and energy;

4) Constraint-routing may be required by some applications, e.g., to establish routing paths that avoid non-encrypted links and/or nodes running low on energy;

5) Scale of the networks may become very large, e.g., on the order of several thousands to millions of nodes; and 6) Nodes may be constrained with a low memory, a reduced processing capability and/or a low power supply (e.g., battery).

In other words, LLNs are a class of network in which nodes (e.g., routers) and their interconnects are constrained; LLN routers typically operate with constraints, e.g., processing power, memory, and/or energy (battery), and their interconnects are characterized by, illustratively, high loss rates, low data rates, and/or instability. The LLN may be sized with nodes ranging from a few dozen to as many as thousands or even millions of LLN routers, and may support point-to-point traffic (between nodes inside the LLN), point-to-multipoint traffic (from a central control point to a subset of nodes inside the LLN) and multipoint-to-point traffic (from nodes inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-19> by Winter, at al. (Mar. 13, 2011 version), provides a mechanism that supports multipoint-to-point (MP2P) traffic from nodes inside the LLN towards a central control point (e.g., LLN Border Routers (LBRs) or "root nodes/devices" generally), as well as point-to-multipoint (P2MP) traffic from the central control point to the nodes inside the LLN (and also point-to-point, or P2P traffic). RPL (pronounced "ripple") may generally be described as a distance vector routing protocol, e.g., executing as routing process 244 on nodes/devices in the LLN. One or more instances of the RPL protocol can be used to build a routing topology that is deployed over the LLN using a set of metrics and constraints. Each RPL routing topology built by an RPL instance may be represented by a Directed Acyclic Graph (DAG) for use in routing traffic/messages 300, in addition to defining a set of features to, e.g., bound the control traffic and/or support repair. Other nodes of the LLN may participate in the routing topology by discovering and attaching to the DAG based on configuration and policies.

Broadly stated, a DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the nodes of the DAG with a larger infrastructure, such as the Internet, a wide area network, or other domain. In addition, a Destination Oriented DAG or DODAG (hereinafter generally denoted as "DAG") is a DAG anchored or rooted at a single destination, i.e., at a single DAG root with no outgoing edges. A "parent" of a particular node within a DAG is an immediate successor of the particular node on a path towards the DAG root, such that the parent has a lower "rank" than the particular node (i.e., a "child"), where the rank of a node identifies the node's position with respect to a DAG root (e.g., the farther away a node is from a root, the higher the rank of that node). Further, a tree is a kind of DAG, where each device/node in the DAG generally has one parent or, as used herein, one preferred parent.

DAGs may generally be built based on an objective function (OF), the role of which is generally to specify rules on how to build the DAG (e.g., number of parents and/or backup parents). In addition, one or more metrics/constraints may be advertised by the routing protocol to optimize the DAG. The routing protocol may further include an optional set of constraints to compute a constrained path, such as when a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the nodes within the DAG be able to reach the goal. In the case where a node is unable to comply with an OF or does not understand or support the advertised metric, it may be configured to join a DAG as a leaf node. As used herein, the various metrics, constraints and/or policies are considered DAG parameters.

Illustratively, example metrics used to select paths (e.g., preferred or "best" parents) may comprise cost, delay, latency, bandwidth and estimated transmission count (ETX), while example constraints that may be placed on the route selection may comprise various reliability thresholds, restrictions on battery operation, multipath diversity, load balancing requirements, bandwidth requirements, transmission types (e.g., wired, wireless), and also a number of selected parents (e.g., single parent trees or multi-parent DAGs). Notably, an example of how routing metrics may be obtained may be found in an IETF Internet Draft, entitled "Routing Metrics used for Path Calculation in Low Power and Lossy Networks"<draft-ietf-roll-routing-metrics-19> by Vasseur, et al. (Mar. 1, 2011 version). Further, an example OF (e.g., a default OF) may be found in an IETF Internet Draft, entitled "RPL Objective Function 0"<draft-ietf-roll-of0-15> by Thubert (Jul. 8, 2011 version).

Building of a DAG may utilize a discovery mechanism to build a logical representation of the network, and route dissemination to establish state within the network so that routers know how to forward messages toward their ultimate destinations. Note that a "router" refers to a node that can forward as well as generate traffic, while a "host" refers to a node that can generate but does not forward traffic. Also, a "leaf" node may be used to generally describe a non-router that is connected to a DAG by one or more routers, but cannot itself forward traffic received on the DAG to another router on the DAG. RPL control messages may be transmitted among the nodes within the network for discovery and route dissemination when building a DAG.

According to the illustrative RPL protocol, a DAG Information Object (DIO) is a type of RPL control message (i.e., a DAG discovery request message) that carries information that allows a node to discover an RPL instance, learn its configuration parameters, select a DAG parent set (in accordance with a parent selection process), and maintain the upward routing topology. A Destination Advertisement Object (DAO) is another type of RPL control message (i.e., a DAG discovery reply message) that conveys destination information upwards along the DAG so that a DAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG root nodes, e.g., following the orientation of the edges within the DAG. Conversely, "downward" or "down" paths are routes that lead in the direction from DAG root nodes towards leaf nodes, e.g., generally going against the orientation of the edges within the DAG.

Generally, a DAG discovery request (e.g., DIO) message is transmitted from the root node(s) of the DAG downward toward the leaves, informing each successive receiving node how to reach the root node (that is, from where the request is received is generally the direction of the root). Accordingly, a DAG is created in the upward (up) direction toward the root node. The DAG discovery reply (e.g., DAO) message may then be returned from the leaves to the root node(s) (unless unnecessary, such as for upward flows only), informing each successive receiving node in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DAG root which can, in turn, build the topology and locally compute downward routes to all nodes in the DAG. Such nodes are then reachable using source routing techniques over regions of the DAG that are incapable of storing downward routing state.

Figure 3:
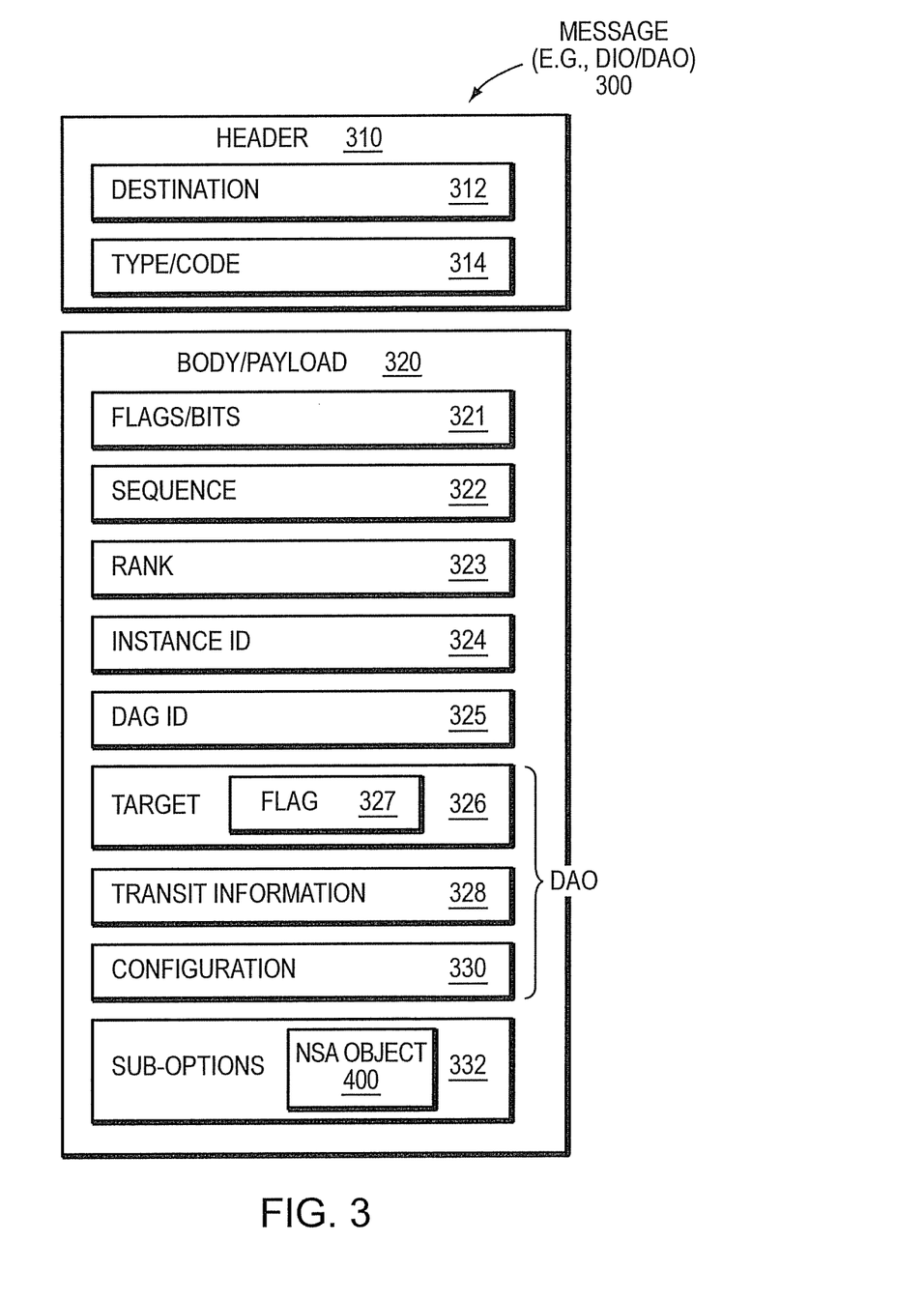
FIG. 3 illustrates an example message.

FIG. 3 illustrates an example message 300 with a simplified control message format that may be used for discovery and route dissemination when building a DAG, e.g., as a DIO or DAO message. Message 300 illustratively comprises a header 310 having a field 312 that holds a destination address of the recipient(s) of the message and one or more fields 314 that identify the type of message (e.g., a RPL control message), as well as a specific code indicating the specific type of message, e.g., a DIO or a DAO (or a DAG Information Solicitation). A body/payload 320 of the message may comprise a plurality of fields used to relay pertinent information. In particular, the fields may comprise various flags/bits 321, a sequence number 322, a rank value 323, a RPL instance ID 324, a DAG ID 325, and other fields, each as may be appreciated in more detail by those skilled in the art. Further, for DAO messages, a target field 326 may be used to record one or more destination prefixes, an optional transit information field 328 may be used to record one or more parents and a configuration field 330 may be used to record one or more parameters. For either DIOs or DAOs, one or more additional sub-option fields 332 may be used to supply additional or custom information within the message 300. For instance, an objective code point (OCP) sub-option field may be used within a DIO to carry codes specifying a particular objective function to be used for building the associated DAG. As described further herein, the sub-option field 332 may also be used as a metric container sub-option field to carry a Node and State Attributes (NSA) object 400 having one or more type-length-value (TLV) encoded data sets configured to report metrics and/or constraints to the nodes of the DAG.

As noted above, the root node (e.g., a LBR) of a DAG is a central authority that defines and controls, for the most part, the behavior of all nodes participating in the RPL topology. The DAG root node also manages several key RPL attributes, such as timer settings and global repair, as well as routing metrics and constraints, which impact the topology. As such, a substantial amount of traffic in the routing topology tends to be concentrated around the DAG root node.

A software upgrade or change in operational mode of the DAG root node may result in a "controlled" failure of the node that results in the root node being powered down and rendered unavailable until it is subsequently powered on in accordance with a conventional reboot process. During the reboot process, one or more nodes (e.g., children) of the DAG may attempt to send packet and/or message traffic to the root node, which does not respond. As a result, the children detect that the DAG root node is unavailable. In contrast to IGPs, such as OSPF, which maintain routing adjacencies between nodes using, e.g., keep-alive message exchanges, RPL makes use of IPv6-based protocol mechanisms to detect the (un)availability of nodes in the DAG. For example, RPL may use the Neighbor Unreachability Detection (NUD) functionality of the Neighbor Discovery (ND) Protocol to enable the children to detect that their neighboring parent, such as the DAG root node, is no longer reachable over the communication links of the DAG. Such a mechanism is triggered upon transmission of a data packet, as opposed to using control plane messages, such as keep-alive. The unavailability of the DAG root node may result in loss of connectivity between the children and the root node.

In response to detecting that the DAG root node is unavailable, the nodes of the routing topology may attempt (re-)convergence by attaching to another parent, i.e., a new root node, possibly leading to collapse of the DAG. The collapsing effect may arise because all of the nodes may attempt to attach to the same DAG root node's children, which may have lost connectivity with the DAG root node during the reboot process. This, in turn, may lead to a substantial collapse of the routing topology (and LLN computer network) as those nodes attempt to find a parent with a route to the DAG root node; however, there is no such root node at this time. Consequently, a reboot of the DAG root node may have adverse consequences on network stability.

Routing Convergence Control

According to one or more embodiments of the disclosure, a technique may enable control of routing convergence in a computer network during reboot of a node of a routing topology represented by a DAG. The rebooting node, e.g., a DAG root node, may transmit a reboot notification message (prior to starting its reboot process) to nodes of the routing topology indicating that the rebooting node is unavailable during the subsequent reboot process. In response to receiving and processing the reboot notification message, the nodes of the routing topology may enter a DAG freeze state that inhibits (prevents) routing convergence in the routing topology during the reboot process so as prevent adverse consequences on network stability, such as collapse of the DAG. Thereafter upon completion of the reboot process, the rebooting node may transmit a clear message to the nodes of the routing topology that instructs the nodes to exit the DAG freeze state.

Illustratively, the technique described herein may be performed by hardware, software, and/or firmware, such as in accordance with topology management process 248 for root node functionality, and may contain computer executable instructions executed by the processor(s) 220 to perform functions (including setting and monitoring of various timers described herein) relating to the technique, e.g., in conjunction with routing process 244 and DAG process 246. In addition, the technique extends the RPL control message format transmitted among the nodes within the routing topology of the network. Specifically, the technique extends the RPL control messaging format by providing novel TLV encoded data sets as further described herein.

Operationally, the rebooting node (e.g., the DAG root node) may initiate the technique in response to a software upgrade, change in operational mode or any "controlled" failure that results in the root node being powered down and rendered unavailable to one or more nodes (e.g., children) of the DAG until the root node is subsequently powered on in accordance with a conventional reboot process. Initiation of the technique illustratively occurs during normal DAG operations and, to that end, illustratively employs a DAG discovery request, e.g., a DIO message 300, that is transmitted by the root node to the nodes of the DAG.

Figure 4A:
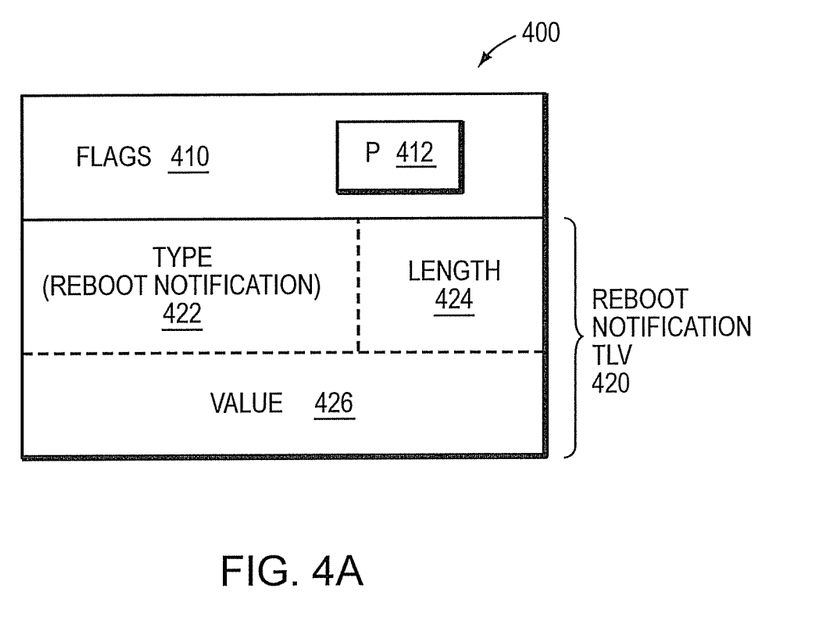
FIG. 4A illustrates an example reboot notification type-length-value (TLV) encoded data set.

According to one or more embodiments herein, the DIO message is generated by the root node and configured with a novel "reboot notification" TLV encoded data set that illustratively transforms the DIO message to a reboot notification message. FIG. 4A illustrates an example reboot notification TLV encoded data set 420 that may be advantageously used with the DIO message 300. The TLV 420 is illustratively contained within the NSA object 400 carried in the metric container sub-option field 332 of the DIO message 300. The NSA object 400 is used to provide information on node characteristics and, thus, may contain a flags field 410 along with one or more TLVs to convey those characteristics.

The reboot notification TLV 420 may be organized to include a Type field 422 containing a predetermined type value indicating the type of information (e.g., reboot notification) communicated (conveyed) in the TLV 420, and a length field 424 that indicates the length of information conveyed. The length (L) parameter contained in the length field is typically implementation-specific and generally denotes the length of a value (V) field 426 containing a value of the actual information, i.e., the reboot notification, conveyed.

The reboot notification message may further include a predetermined flag, e.g., a propagation (P) flag 412, within the flags field 410 that is configured to specify nodes in the routing topology for receiving the message. According to an illustrative embodiment described herein, assertion of the P flag 412, e.g., to a first predetermined value, may specify that the reboot notification message propagate to and be received by a particular rank of nodes in the routing topology. For example, the assertion of the P flag 412 may specify that rank of node(s) receiving the reboot notification is the next higher (incremented) rank of nodes (i.e., children) from the rebooting node (i.e., parent). In contrast, non-assertion of the P flag 412, e.g., to a second predetermined value, may illustratively specify that the reboot notification message propagate to and be received by all nodes of the routing topology. In any case, transmission and reception of the reboot notification message to the specified nodes indicates that the rebooting node, e.g., the DAG root node, is unavailable during a subsequent reboot process. Note that the reboot notification message may provide the identity of the rebooting node within, e.g., the DAG ID field 325 of the DIO message 300. If the reboot notification message identifies the rebooting node as the DAG root node, the specified nodes illustratively do not attempt to forward the message to an alternate parent (if one exists).

Figure 4B:
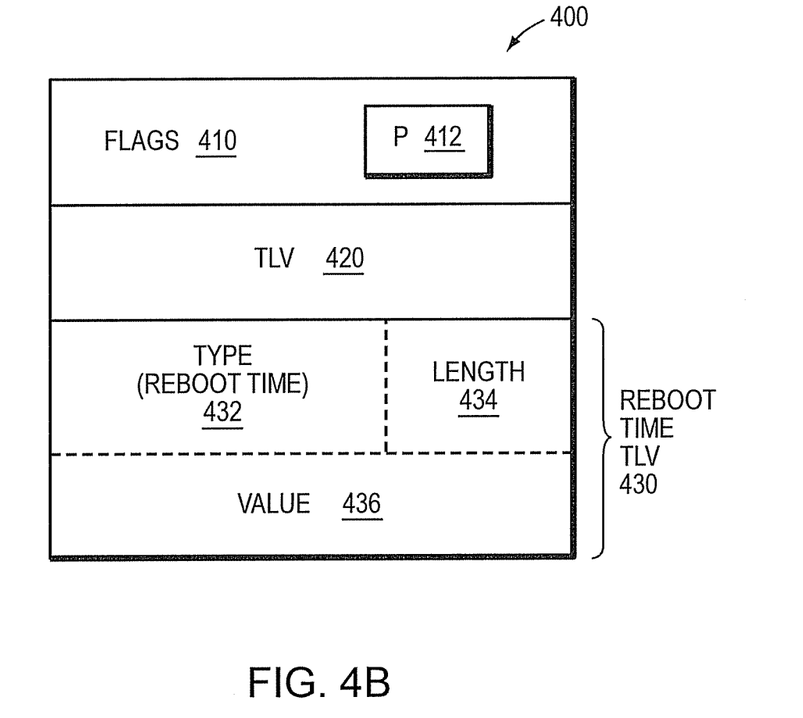
FIG. 4B illustrates an example reboot time TLV encoded data set.

In accordance with the one or more embodiments described herein, the reboot notification message may be further optionally configured with a novel "reboot time" TLV encoded data set that specifies an estimated time to complete the reboot process. FIG. 4B illustrates an example reboot time TLV encoded data set 430 that is illustratively contained within the NSA object 400 carried in the metric container sub-option field 332 of the DIO message 300. The reboot time TLV 430 may be organized to include a type field 432 containing a predetermined type value indicating the type of information (e.g., reboot time) conveyed in the TLV 430, and a length field 434 indicating the length of information conveyed and a value (V) field 436 containing a value specifying the estimated time to complete the reboot process.

After transmitting the reboot notification message, the DAG root node may set (arm) a timer, e.g., a reboot notification traversal timer, which is illustratively configured with a value that is sufficient to enable the message to traverse the routing topology (DAG) so that it may be received and processed by the specified nodes. Upon expiration of the reboot notification traversal timer, the reboot process for the DAG root node commences (starts). Note that it may be desirable to transmit multiple reboot notification messages into the routing topology to compensate for potential non-reception (i.e., dropping) of the message by the receiving nodes. In that case, the reboot notification traversal timer may be set after each reboot notification message transmission.

Upon receiving and processing the reboot notification message, the specified nodes of the routing topology may enter a predefined state, i.e., a DAG freeze state. The DAG freeze state illustratively inhibits routing convergence by the specified nodes in the routing topology during the reboot process. Convergence is inhibited during the reboot process so as to avoid initiation of routing measures that may lead to adverse consequences on network stability, such as collapse of the DAG. Packet or message traffic received by a specified node in the DAG freeze state is temporarily stored (buffered) in buffering resources, e.g., data structures such as queues 250, within the node without any attempt by the node to reattach to any other node.

According to one or more embodiments described herein, the specified node may then begin monitoring its queues 250. If a length of a queue (i.e., entries 252 of the queue 250 that are populated with packet/message traffic) exceeds a predetermined threshold, the node may relay the reboot notification message to other nodes, e.g., the node's children, of the routing topology. Note that in an alternative embodiment, the node may relay the reboot notification message to its children upon the node's reception of the message. This relaying procedure propagates down the DAG as a wave of reboot notification messages to prevent the routing topology from becoming congested and reaching a point where no traffic can be forwarded during the reboot process.

The specified node(s) may then locally discard (drop) low priority traffic to lessen the buffering load and/or free entries 252 of the queue 250. Illustratively, discarding of low priority traffic is dependent upon quality of service (QoS) capabilities and policies of the node, wherein the priority of the traffic, e.g., data packets, may be determined using a DS byte field of an IPv6 header coupled to packets. In yet another alternative embodiment, the node may redirect its traffic to a less-preferred routing topology (DAG), if it had previously joined such a DAG.

In accordance with the one or more embodiments described herein, the DIO message 300 generated by the DAG root node (i.e., the rebooting node) may be configured with a novel "clear" TLV encoded data set that illustratively transforms the DIO message to a clear message. The clear message is transmitted by the root node once the reboot process completes and instructs the specified nodes to exit the DAG freeze state. Note that the DAG root node may also reset other timers, e.g., trickle timers, to ensure successful transmission and reception of the clear message to the specified nodes of the routing topology.

Figure 4C:
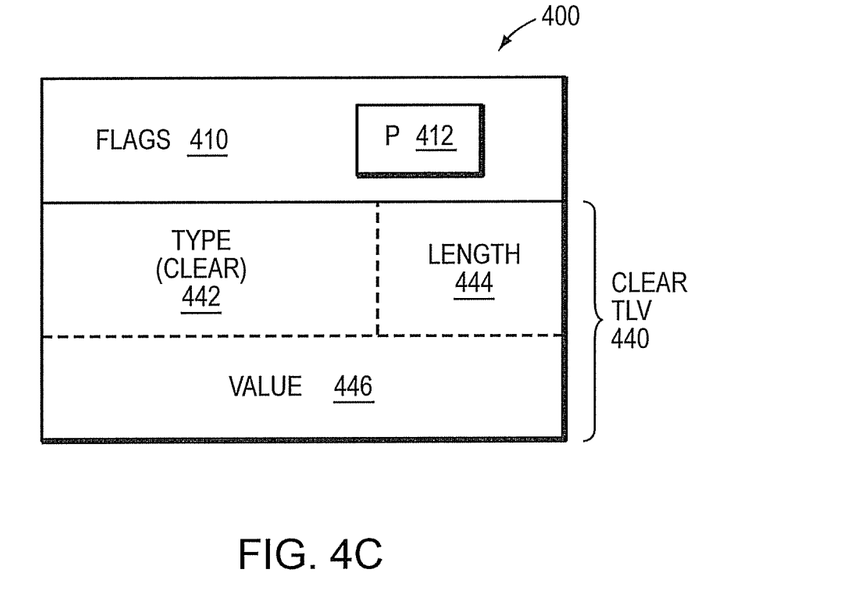
FIG. 4C illustrates an example clear TLV encoded data set.

FIG. 4C illustrates an example clear TLV encoded data set 440 that may be advantageously used with the DIO message 300. The TLV 440 is illustratively contained within the NSA object 400 carried in the metric container sub-option field 332 of the DIO message 300. The clear TLV 440 may be organized to include a type field 442 containing a predetermined type value indicating the type of information (e.g., clear) conveyed in the TLV 440, and a length field 444 indicating the length of information conveyed and a value (V) field 446 containing a value specifying the instruction to exit the DAG freeze state.

According to one or more embodiments described herein, the specified nodes that process the clear message to enter the DAG freeze state maintain a timer, e.g., a safety net timer, having a value that is greater than the reboot time estimated for completion of the reboot process. The safety net timer is illustratively used to ensure that if the rebooting node (i.e., DAG root node) does not complete its reboot process, the nodes are not permanently stuck in the DAG freeze state. Therefore, if the safety net timer expires prior to reception of the clear message, the specified nodes abandon expectation that the DAG root node will successfully reboot, exit the DAG freeze state and attempt routing convergence by, e.g., discovering and attaching to an alternate DAG. Note that unsuccessful completion of the reboot process is a rare event and, as such, the specified nodes generally cancel the safety net timer and exit the DAG freeze state.

Figure 5:
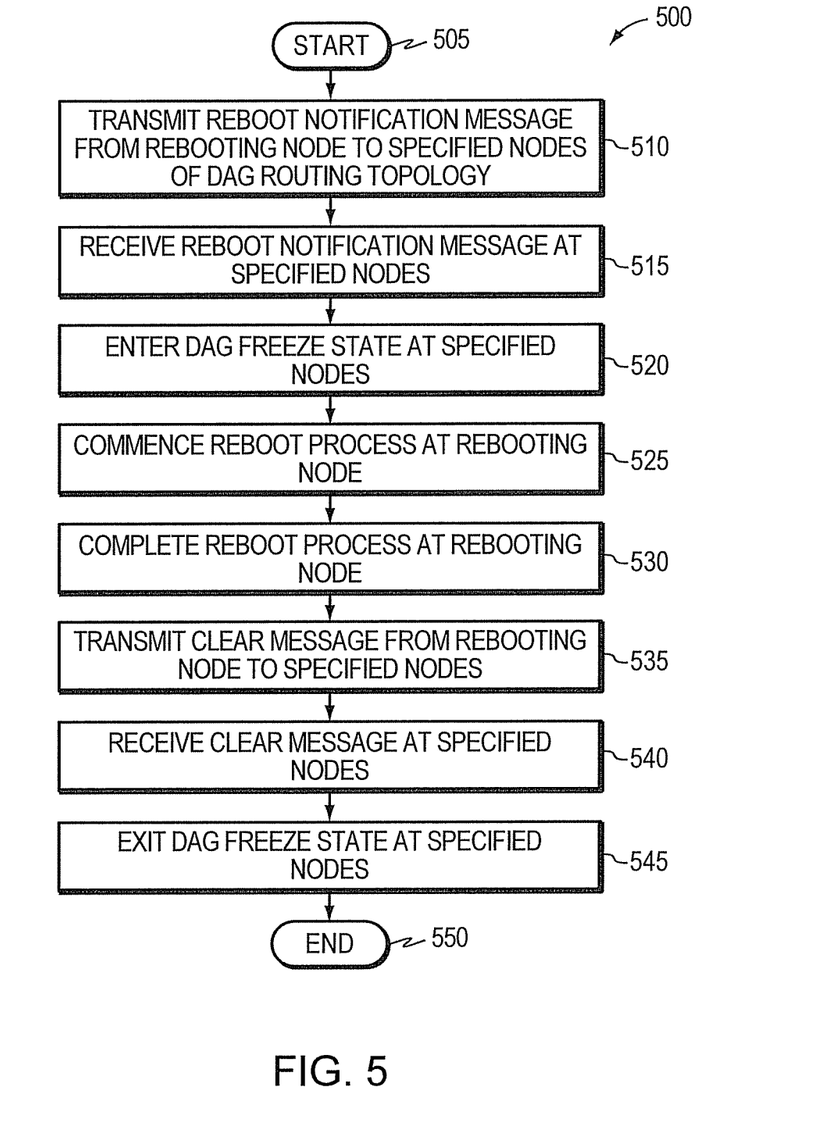
FIG. 5 illustrates an example simplified procedure for enabling control of convergence during reboot of a node in a DAG routing topology.

FIG. 5 illustrates an example simplified procedure for enabling control of convergence during reboot of a node in a DAG routing topology in accordance with one or more embodiments described herein. The procedure 500 starts at step 505 and continues to step 510 where a rebooting node, e.g., a DAG root node, transmits a reboot notification message to specified nodes of the DAG routing topology indicating that the rebooting node is unavailable during a subsequent reboot process. In step 515, the specified nodes receive the reboot notification message and, in step 520, the specified nodes enter a DAG freeze state that inhibits routing convergence in the DAG routing topology during the reboot process. In step 525, the reboot process commences at the rebooting node. Thereafter, in step 530, the reboot process completes, and in step 535, the rebooting node transmits a clear message to the specified nodes that instructs the nodes to exit the DAG freeze state. In step 540, the specified nodes receive the clear message and, in step 545, the specified nodes exit the DAG freeze state in response to processing of the clear message. The procedure then ends in step 550.

The technique described herein advantageously provides smooth handling of node reboot by inhibiting convergence of nodes in a DAG routing topology during a reboot process of a rebooting node, such as a DAG root node, to prevent adverse consequences on network stability, including possible packet/message loss. In particular, convergence is inhibited during the reboot process to prevent collapse of the DAG when a potentially large number of nodes attempt to find a parent with a route to the DAG root node and no such node exists at that time. The technique also extends the RPL control message format transmitted among the nodes within the routing topology of the computer network through the provision of novel TLV encoded data sets. Notably, inhibition of routing convergence and extension of the RPL control messaging formats do not impact the routing behavior of RPL protocol.

While there have been shown and described illustrative embodiments of a technique that enables control of routing convergence in a computer network during reboot of a node of a routing topology represented by a DAG, it is to be understood that various other adaptations and modifications may be made within the spirit and scope of the embodiments herein. For instance, the embodiments have been shown and described herein with relation to the DAG root node as the rebooting node. However, the embodiments in their broader sense are not so limited, and may, in fact, pertain to any rebooting node in the routing topology that has a potentially large number of children.

For example, if the rebooting node has a number of children that exceeds a predetermined threshold (preferably configured by policy) and/or the estimated reboot time is acceptable according to traffic type and empirical traffic profiling, then the technique may be extended to "freeze" the node's children of a sub-DAG to avoid substantial traffic churn in control plane overhead and, generally, the routing topology of the computer network. Freezing of the sub-DAG may be advantageous even if the children of the rebooting node may be able to find an alternate parent to the DAG root node.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on one or more tangible (non-transitory) computer-readable storage media (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   transmitting, by a rebooting node before commencing a reboot process, a reboot notification message to specified nodes of a computer network having a routing topology represented by a directed acyclic graph (DAG), the reboot notification message indicating that the rebooting node of the DAG is unavailable during the reboot process, the reboot notification message further instructing the specified nodes to enter a DAG freeze state that inhibits routing convergence in the routing topology during the reboot process, the reboot notification message providing an identity of the rebooting node;
   causing the specific nodes to receive traffic during the DAG freeze state, store the received traffic in a queue, monitor a length of the queue, and if the length of the queue exceeds a predetermined threshold, relay the reboot notification to other nodes of the routing topology; and
   transmitting a clear message to the specified nodes upon completion of the reboot process, the clear message instructing the specified nodes to exit the DAG freeze state.

2. The method as in claim 1, wherein the reboot notification message identifies the rebooting node as a root node of the DAG.

3. The method as in claim 2, wherein the reboot notification message is a DAG Information Object (DIO) message and wherein transmitting the reboot notification message comprises:
   generating the DIO message; and
   configuring the DIO message with a reboot notification type-length-value (TLV) data set that transforms the DIO message to the reboot notification message.

4. The method as in claim 3, wherein configuring the DIO message comprises:
   carrying a node and state attributes (NSA) object containing the reboot notification TLV data set within a metric container sub-option field of the DIO message, the NSA object providing information on node characteristics.

5. The method as in claim 1 further comprising:
   configuring the reboot notification message with a reboot time type-length-value (TLV) data set that specifies an estimated time to complete the reboot process.

6. The method as in claim 1 further comprising:
   configuring the reboot notification message with a propagation flag; and
   asserting the propagation flag to specify propagation of the reboot notification message to a rank of nodes in the routing topology, wherein the rank of nodes comprises the specified nodes.

7. The method of claim 1 wherein transmitting the reboot notification message comprises:
setting a reboot notification timer configured with a value to enable the reboot notification message to traverse the routing topology so that the message is received and processed by the specified nodes.

8. The method of claim 2 further comprising:
generating a DAG Information Object (DIO) message; and
configuring the DIO message with a clear type-length-value (TLV) data set that transforms the DIO message to the clear message.

9. A method comprising:
receiving a reboot notification message transmitted by a rebooting node of a computer network before commencing a reboot process, the computer network having a routing topology represented by a directed acyclic graph (DAG), the reboot notification message indicating that the rebooting node is unavailable during the reboot process;
entering a DAG freeze state upon reception and processing of the reboot notification message, the DAG freeze state inhibiting routing convergence in the routing topology during the reboot process, the entering the DAG freeze state comprising receiving traffic during the DAG freeze state, storing the received traffic in a queue, monitoring a length of the queue, and if the length of the queue exceeds a predetermined threshold, relaying the reboot notification to other nodes of the routing topology;
receiving a clear message transmitted by the rebooting node upon completion of the reboot process; and
exiting the DAG freeze state in response to processing of the clear message.

10. The method as in claim 9 further comprising:
discarding low priority traffic of the received traffic from the queue when the length of the queue exceeds the predetermined threshold.

11. The method as in claim 9, wherein entering the DAG freeze state comprises:
setting a safety net timer having a value that is greater than a time estimated for completion of the reboot process;
exiting the DAG freeze state if the safety net timer expires prior to reception of the clear message; and
attempting routing convergence in the routing topology.

12. An apparatus comprising:
one or more network interfaces connected to a computer network having a routing topology represented by a directed acyclic graph (DAG);
a processor coupled to the network interfaces and adapted to execute one or more processes; and
a memory configured to store a process executable by the processor, the process when executed operable to:
transmit, by a rebooting node before commencing a reboot process, a reboot notification message to specified nodes of the routing topology, the reboot notification message indicating that the rebooting node of the DAG is unavailable during the reboot process, the reboot notification message including a propagation flag configured to identify the specified nodes, the reboot notification message instructing the specified nodes to enter a DAG freeze state that inhibits routing convergence in the routing topology during the reboot process, the reboot notification message further providing an identity of the rebooting node;
cause the specific nodes to receive traffic during the DAG freeze state, store the received traffic in a queue; monitor a length of the queue, and if the length of the queue exceeds a predetermined threshold, relay the reboot notification to other nodes of the routing topology; and
transmit a clear message to the specified nodes upon completion of the reboot process, the clear message instructing the specified nodes to exit the DAG freeze state.

13. The apparatus as in claim 12, wherein the reboot notification message is a DAG Information Object (DIO) message and wherein the process when executed is operable to:
identify the rebooting node as a root node of the DAG within a field of the DIO message.

14. The apparatus as in claim 13 wherein the process when executed is operable to:
generate the DIO message; and
configure the DIO message with a reboot notification type-length-value (TLV) data set that transforms the DIO message to the reboot notification message.

15. The apparatus as in claim 12, wherein the process when executed is operable to:
assert the propagation flag to specify propagation of the reboot notification message to a rank of nodes in the routing topology, wherein the rank of nodes comprises the specified nodes.

16. The apparatus as in claim 12 wherein the process when executed is operable to:
non-assert the propagation flag to specify propagation of the reboot notification message to all nodes of the routing topology.

17. The apparatus as in claim 12, wherein the process when executed is operable to:
configure the reboot notification message with a reboot time type-length-value (TLV) data set that specifies an estimated time to complete the reboot process.

18. The apparatus as in claim 12, wherein the process when executed is operable to:
set a reboot notification timer configured with a value to enable the reboot notification message to traverse the routing topology so that the message is received and processed by the specified nodes.

19. The apparatus as in claim 13, wherein the process when executed is operable to:
generate the DIO message; and
configure the DIO message with a clear type-length-value (TLV) data set that transforms the DIO message to the clear message.

20. The apparatus as in claim 12, wherein the process when executed is operable to:
configure the reboot notification message with a propagation flag; and
assert the propagation flag to specify propagation of the reboot notification message to a rank of nodes in the routing topology, wherein the rank of nodes comprises the specified nodes.

* * * * *